United States Patent
Park (10) Patent No.: US 11,258,257 B2
(45) Date of Patent: Feb. 22, 2022

(54) GRID VOLTAGE STABILIZATION SYSTEM

(71) Applicant: LS ELECTRIC CO., LTD., Anyang-si (KR)

(72) Inventor: Min-Jun Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 16/771,973

(22) PCT Filed: Dec. 11, 2018

(86) PCT No.: PCT/KR2018/015697
§ 371 (c)(1),
(2) Date: Jun. 11, 2020

(87) PCT Pub. No.: WO2019/143023
PCT Pub. Date: Jul. 25, 2019

(65) Prior Publication Data
US 2021/0143643 A1  May 13, 2021

(30) Foreign Application Priority Data

Jan. 22, 2018  (KR) .................. 10-2018-0007537

(51) Int. Cl.
*H02J 1/10* (2006.01)
*H02J 3/18* (2006.01)
*H02J 3/32* (2006.01)

(52) U.S. Cl.
CPC . *H02J 3/18* (2013.01); *H02J 3/32* (2013.01)

(58) Field of Classification Search
CPC ..................................... H02J 3/18; H02J 3/32
(Continued)

(56) References Cited

U.S. PATENT DOCUMENTS

2013/0134779 A1* 5/2013 Watanabe ............... G06Q 50/06
307/24
2013/0154570 A1* 6/2013 Nomura ................ H01M 10/44
320/128
(Continued)

FOREIGN PATENT DOCUMENTS

JP       2012016261 A       1/2012
JP       2016185018 A      10/2016
(Continued)

OTHER PUBLICATIONS

Korean Office Action for related Korean Application No. 10-2018-0007537; action dated Aug. 13, 2020; (4 pages).
(Continued)

*Primary Examiner* — Richard Tan
(74) *Attorney, Agent, or Firm* — K&L Gates LLP (57) ABSTRACT

A grid voltage stabilization system according to an embodiment of the present invention comprises: a power generation device for generating power by using a new and renewable energy source, and supplying the generated power to a grid; an energy storage system (ESS) for, according to a command value, storing power generated in the power generation device in a battery, or supplying power stored in the battery to the grid in the form of active power and reactive power; and a power management system (PMS) for, when a voltage value of the grid is out of a reference range, controlling the magnitude of the reactive power to be supplied to the grid such that the command value is changed according to the voltage value of the grid to enable the voltage of the grid to be within the reference range.

6 Claims, 7 Drawing Sheets

(58) Field of Classification Search
USPC .......................................................... 307/43
See application file for complete search history.

(56) References Cited

U.S. PATENT DOCUMENTS

2015/0357854 A1\* 12/2015 Watanabe ............... H02J 3/241
320/134
2016/0268802 A1   9/2016 Shim

FOREIGN PATENT DOCUMENTS

| KR | 20120134875 A | 12/2012 |
| KR | 20130120640 A | 11/2013 |
| KR | 20140075063 A | 6/2014 |

OTHER PUBLICATIONS

International Search Report for related International Application No. PCT/KR2018/015697; dated Jul. 25, 2019; (5 pages).
Written Opinion for related International Application No. PCT/KR2018/015697; dated Jul. 25, 2019; (5 pages).

\* cited by examiner

GRID VOLTAGE STABILIZATION SYSTEM

CROSS-REFERENCE TO RELATED APPLICATIONS

The present application is a National Stage of International Application No. PCT/KR2018/015697, filed on Dec. 11, 2018, which claims the benefit of earlier filing date and right of priority to Korean Application No. 10-2018-0007537 filed on Jan. 22, 2018, the contents of which are all hereby incorporated by reference herein in their entirety.

FIELD OF THE INVENTION

The present disclosure relates to a system for stabilizing a voltage of a power system. More specifically, the present disclosure relates to a system for stabilizing a voltage of a power system by controlling a magnitude of a reactive power to be supplied to the power system.

BACKGROUND OF THE INVENTION

In recent years, use of fossil fuels as a major energy source has caused severe side effects such as climate variation, and thus restrictions on use thereof have been intensified. Recently, renewable energy has been spotlighted due to depletion of coal and oil. Accordingly, importance of renewable energy based power generation to generate eco-friendly power, and to supply the generated power stably and efficiently is emerging.

In general, a source of the renewable energy has characteristic that an output thereof changes over time. Accordingly, a power generation amount resulting from the renewable energy based generation may change rapidly over time.

For example, when using solar power or wind power, a solar radiation quantity or a wind speed changes over time. Accordingly, the power amount generated using the solar power or the wind power changes over time.

In a grid or power system-connected renewable energy based generation system, the aforementioned variation in the power amount affects a frequency and a voltage of the power system or the gird. The higher the variation of the frequency and voltage of the power system, the lower a quality of the power.

Further, when a large-scale wind power based generation facility currently being built is connected to the power system, a serious problem in terms of the power system stability may occur. For example, when a reduction amount of a maximum output of the wind power based generator exceeds a power reserve for operating the power system, this may cause a serious problem that the power system collapses.

Accordingly, there is a need for a method of stabilizing the voltage of the power system in order to secure the power system stability.

BRIEF SUMMARY OF THE INVENTION

A purpose of the present disclosure is to provide a system for stabilizing a voltage of a power system, in which a magnitude of a reactive power to be supplied from an ESS (Energy Storage System) to the power system is controlled to maintain a current voltage value of the power system within a predefined range from a reference voltage of the power system, thereby securing power system stability.

Further, another purpose of the present disclosure is to provide a system for stabilizing a voltage of a power system, in which a magnitude of a reactive power is gradually controlled based on a difference between a current voltage value of the power system and a reference voltage of the power system, so that the current voltage value of the power system quickly follows the reference voltage thereof.

Further, still another purpose of the present disclosure is to provide a system for stabilizing a voltage of a power system, in which when a current voltage value of the power system is outside a control limit range, creation of a command value is stopped, and an ESS and a renewable energy based generator are disconnected with the power system, such that the power system is protected when an output of a renewable energy source fluctuates excessively.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

A system for stabilizing a voltage of a power system according to one embodiment according to the present disclosure to achieve the above purposes includes a power generator for generating power using a renewable energy source, and for supplying the generated power to the power system; an energy storage system (ESS) for storing the generated power from the power generator into a battery or supplying the power stored in the battery to the power system in a form of an active power and an reactive power, based on a command value; and a power management system (PMS). When a current voltage value of the power system is outside a reference voltage range thereof, the PMS is configured to change the command value based on the current voltage value of the power system to control a magnitude of the reactive power to be supplied to the power system so that the current voltage value of the power system changes to a value within the reference voltage range.

In accordance with the present disclosure, the magnitude of the reactive power to be supplied from the ESS (Energy Storage System) to the power system is controlled to maintain the current voltage value of the power system within a predefined range from a reference voltage of the power system, thereby securing power system stability.

Further, in accordance with the present disclosure, the magnitude of the reactive power is gradually controlled based on a difference between the current voltage value of the power system and a reference voltage of the power system, so that the current voltage value of the power system quickly follows the reference voltage thereof.

Furthermore, in accordance with the present disclosure, when the current voltage value of the power system is outside a control limit range, creation of the command value is stopped, and the ESS and the renewable energy based generator are disconnected with the power system, such that the power system is protected when an output of the renewable energy source fluctuates excessively.

DETAILED DESCRIPTION OF THE INVENTION

The purposes, features and advantages as above-described will be described in detail below with reference to the accompanying drawings. Accordingly, a person with ordinary knowledge in the technical field to which the present disclosure belongs may easily implement a technical idea of the present disclosure. In describing the present disclosure, when it is determined that a detailed description of a known component related to the present disclosure may unnecessarily obscure a gist of the present disclosure, the detailed description thereof is omitted. Hereinafter, preferred embodiments of the present disclosure will be described in detail with reference to the accompanying drawings. The same reference numerals in the drawings are used to indicate the same or similar components.

Hereinafter, a configuration and an operation process of a system for stabilizing a voltage of a power system will be described in detail with reference to FIG. 1 to FIG. 7.

Figure 1:
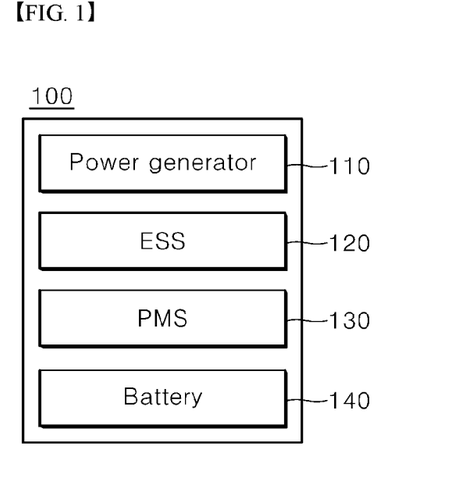
FIG. 1 shows a system for stabilizing a voltage of a power system according to an embodiment according to the present disclosure.
Figure 2:
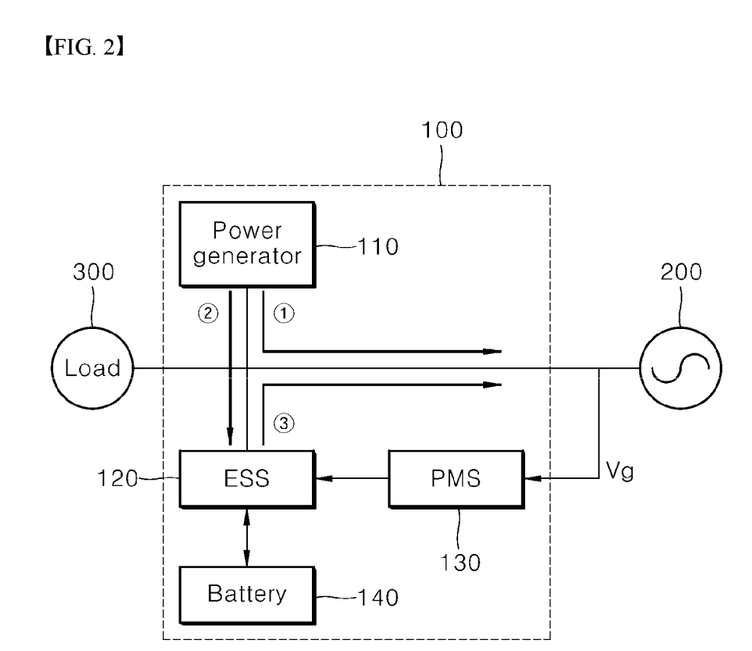
FIG. 2 is a diagram showing a control flow of the system for stabilizing the voltage of the power system shown in FIG. 1.

FIG. 1 shows a system for stabilizing a voltage of a power system according to an embodiment according to the present disclosure. FIG. 2 is a diagram showing a control flow of the system for stabilizing the voltage of the power system shown in FIG. 1.

Figure 3:
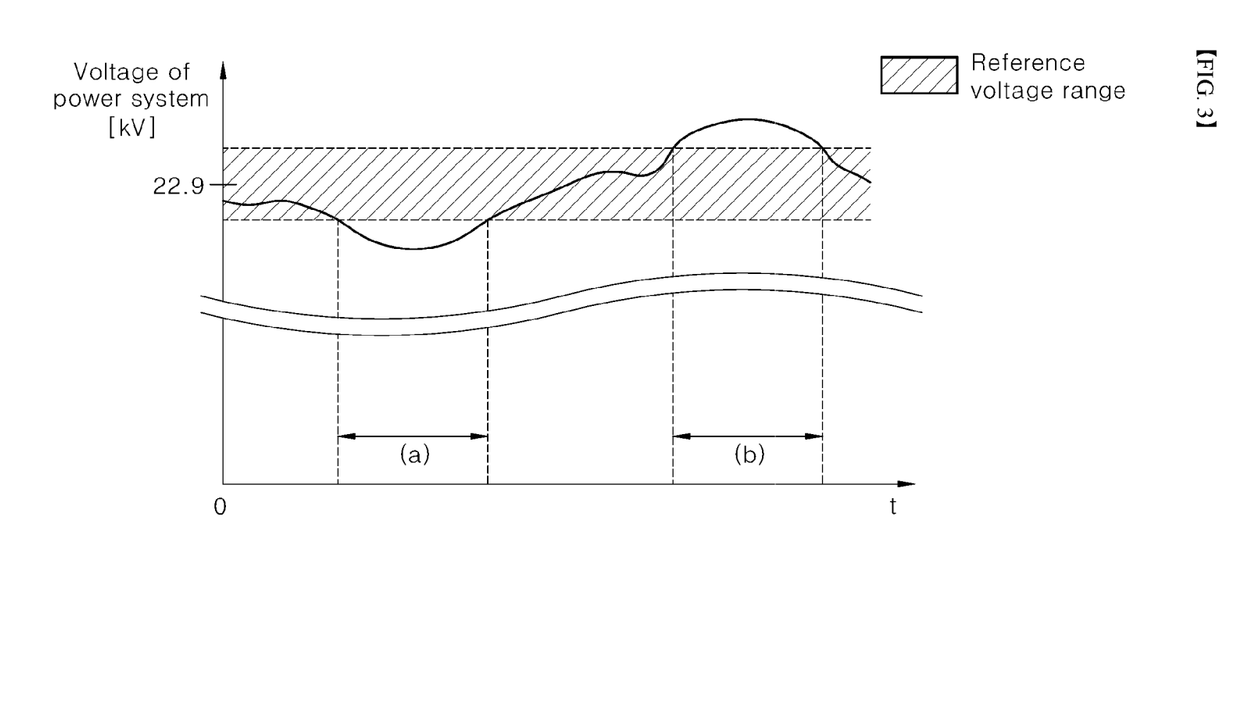
FIG. 3 is a graph showing an example of a voltage value of a power system that varies over time.
Figure 4:
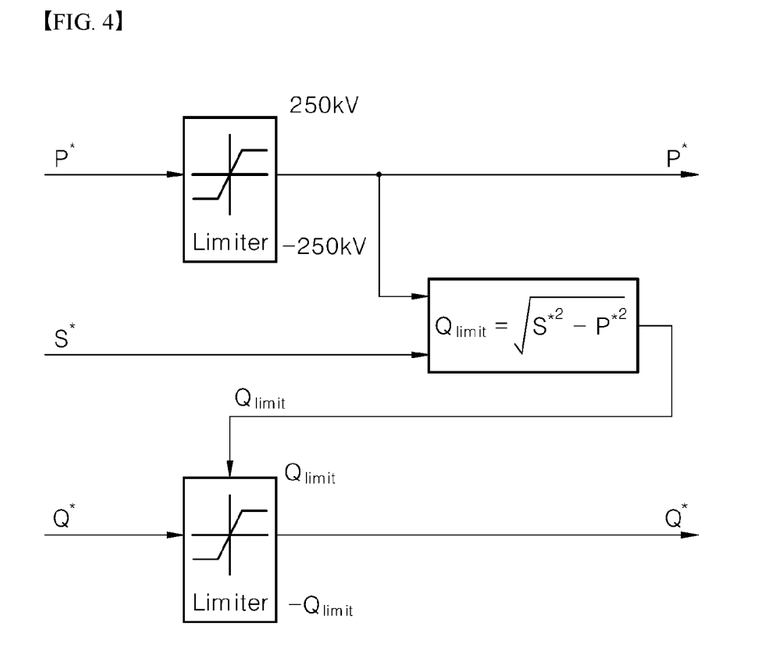
FIG. 4 is a diagram showing a state in which a reactive power related command value is created according to an active power related command value.
Figure 5:
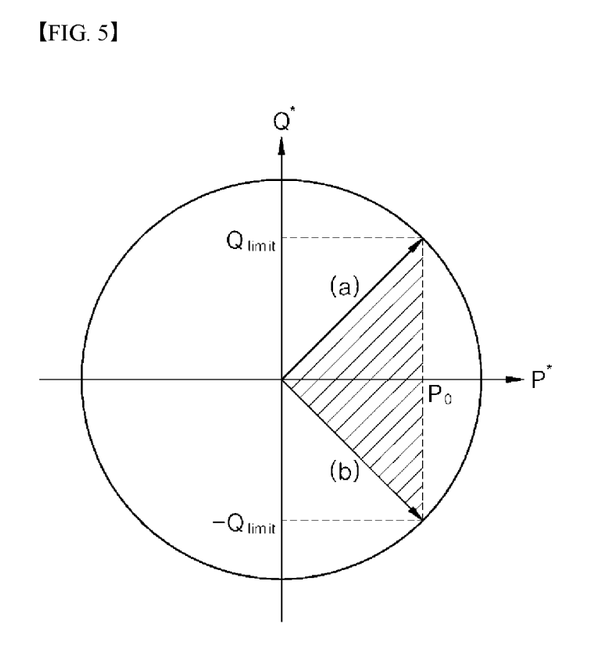
FIG. 5 is a graph showing a range of a reactive power that may be output according to an active power related command value.

FIG. 3 is a graph showing an example of a voltage value of a power system that varies over time. FIG. 4 is a diagram showing a state in which a reactive power related command value is created according to an active power related command value. FIG. 5 is a graph showing a range of a reactive power that may be output according to an active power related command value.

Figure 6:
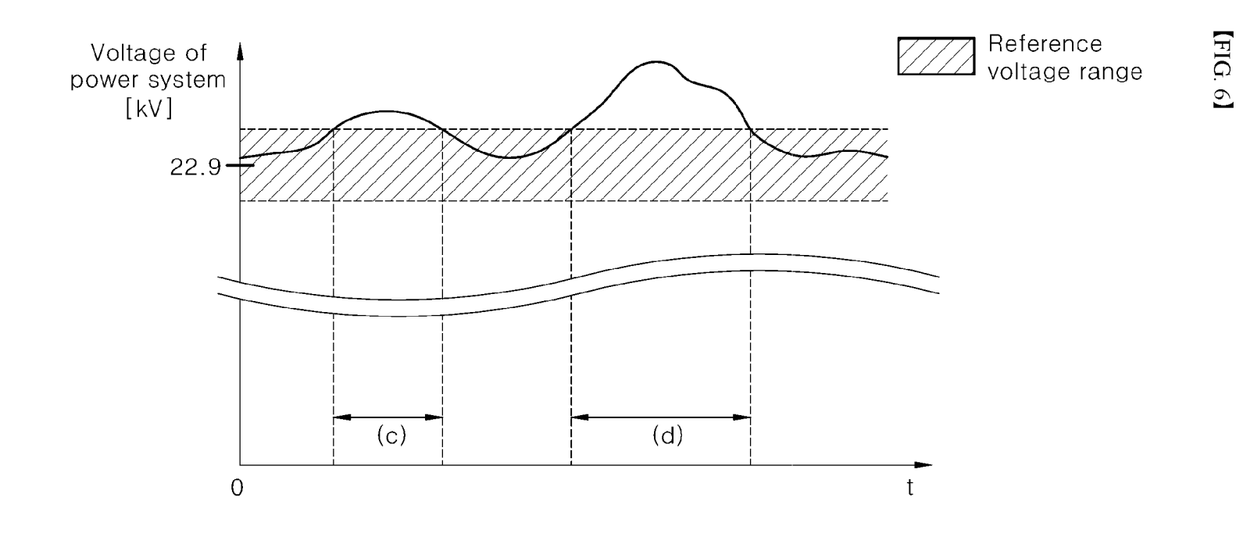
FIG. 6 is a graph showing another example of a voltage value of a power system that varies over time.
Figure 7:
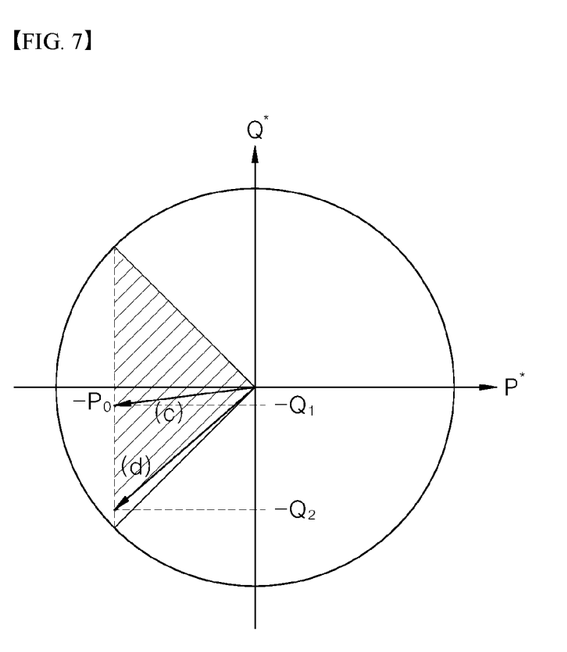
FIG. 7 is a graph showing a command vector for stabilizing the voltage value of the power system shown in FIG. 6.

FIG. 6 is a graph showing another example of a voltage value of a power system that varies over time. FIG. 7 is a graph showing a command vector for stabilizing the voltage value of the power system shown in FIG. 6.

Referring to FIG. 1 and FIG. 2, a system 100 for stabilizing a voltage of a power system according to an embodiment according to the present disclosure may include a power generator 110, an ESS (Energy Storage System) 120, a PMS (Power Management System) 130, and a battery 140. The system 100 for stabilizing the voltage of the power system shown in FIG. 1 is merely one example. The components thereof are not limited to the embodiment shown in FIG. 1. Some components may be added, changed, or deleted, as necessary.

The power generator 110 may generate power using a renewable energy source, and may supply the generated power to the power system 200. In other words, according to the present disclosure, the power generator 110 may be a grid or power system-connected power generator.

The renewable energy source may include an energy source whose output is not constant over time. Examples thereof may include solar power, wind power, and geothermal power. Accordingly, an amount of the power generated by the power generator 110 may change over time.

The ESS 120 may store the power generated by the power generator 110 in the battery 140 or supply the power stored in the battery 140 to the power system 200 in a form of an active power and a reactive power, based on a command value.

In this connection, the command value may include a charging command and a discharging command. Each of the charging command and the discharging command may include an active power-related command value P* and a reactive power-related command value Q*. The command value may be created by the PMS 130, which will be described later, and then may be provided therefrom to the ESS 120.

More specifically, the ESS 120 may receive the power generated by the power generator 110 according to the charging command (②), and store the received power in the battery 140. Further, the ESS 120 may supply the power stored in the battery 140 to the power system 200 according to the discharging command (③).

When the ESS 120 supplies the power stored in the battery 140 to the power system 200, the ESS 120 may supply the active power according to the active power-related command value P* and the reactive power according to the reactive power-related command value Q* to the power system 200.

In one example, in accordance with the present disclosure, the power system 200 may use a 3-phase AC power. Thus, the ESS 120 may include a PCS (Power Conditioning System) to convert electrical characteristics of the power generated by the power generator 110 or convert electrical characteristics of the power stored in the battery 140, based on the command value.

In this connection, the electrical characteristics may include a type (alternating current or direct current) of the power, a magnitude of the power, and a frequency of the power.

Accordingly, the PCS may convert the electrical characteristics of the power generated by the power generator 110 to match the electrical characteristics of the power stored in the battery 140. For example, because a DC power is stored in the battery 140, the PCS may convert the power generated by the power generator 110 into the DC power via a DC/DC converter or an AC/DC converter.

In one example, the PCS may convert the electrical characteristics of the DC power stored in the battery 140 to match the electrical characteristics of the power required by the power system 200. To this end, the PCS may include a DC/AC converter. When a magnitude of a voltage required by the power system 200 is greater than a magnitude of a voltage stored in the battery 140, the PCS may further include a transformer, a switchgear, and the like.

The PMS 130 may provide the discharging command to the ESS 120 when a power amount consumed by the load 300 connected to the power system 200 is greater than the power amount generated by the power generator 110. When the power amount consumed by the load 300 is smaller than the power amount generated by the power generator 110, the charging command may be provided to the ESS 120.

To this end, the PMS 130 may monitor the power amount generated by the power generator 110 and the power amount consumed by the load 300. More specifically, the PMS 130 may monitor the power generation amount generated by the power generator 110 by measuring a power of an output terminal of the power generator 110, and may monitor the power consumption amount consumed by the load 300 by measuring a power of a supply terminal where the power is supplied to the load 300.

The PMS 130 may be configured to supply the charging command to the ESS 120 when the power generation amount is greater than the power consumption amount, in other words, when the power is excessively generated. Accordingly, the ESS 120 may convert the electrical characteristics of the over-generated power and store the power having the converted electrical characteristics into the battery 140.

To the contrary, the PMS 130 may be configured to provide the discharging command to the ESS 120 when the power generation amount is smaller than the power consumption amount. Accordingly, the ESS 120 may convert the electrical characteristics of the power corresponding to a shortage relative to the power stored in the battery 140 and supply the power having the converted electrical characteristics to the load 300.

Further, the PMS 130 may provide the charging command to the ESS 120 when a frequency of the current power of the power system 200 exceeds a reference frequency range. When the frequency of the current power of the power system 200 is lower than the reference frequency range, the PMS 130 may provide the discharging command to the ESS 120.

When the power generation amount of the power generator 110 is not constant, the frequency of the power of the power system 200 may change over time in proportion to the power generation amount. More specifically, when the reference frequency of the power of the power system 200 is 60 [Hz], when the power generation amount is greater than the power consumption amount, a frequency of the power of the power system 200 may increase to a value higher than 60 [Hz]. When the power consumption amount is greater than the power generation amount, the frequency of the power of the power system 200 may decrease to a value lower than 60 [Hz].

In one example, the reference frequency range may be set to a percentage around the reference frequency. For example, when the reference frequency is 60 [Hz], the reference frequency range may be set to 5% around the reference frequency. In other words, the reference frequency range may be set to 57 [Hz] to 63 [Hz].

The PMS 130 may monitor the frequency of the power of the power system 200 by measuring a power of a terminal of the power system. When the frequency of the power of the power system 200 exceeds the reference frequency range, the PMS 130 may provide the charging command to the ESS 120. Accordingly, the ESS 120 may convert the electrical characteristics of the power generated by the power generator 110 and store the power having the converted electrical characteristics in the battery 140.

To the contrary, when the monitored frequency of the power of the power system 200 is lower than the reference frequency range, the PMS 130 may provide the discharging command to the ESS 120. Accordingly, the ESS 120 may convert the electrical characteristics of the power stored in the battery 140 and supply the power having the converted electrical characteristics to the power system 200.

Referring again to FIG. 2, when a voltage value Vg of the power system 200 is outside a reference voltage range, the PMS 130 may change the command value according to the voltage value Vg of the power system 200 to control a magnitude of the reactive power to be supplied to the power system 200 such that the voltage value Vg of the power system 200 is within the reference voltage range.

In this connection, the reference voltage range may be set to a percentage around the reference voltage. For example, when the reference voltage (reference voltage measured at the terminal of the power system 200) is 22.9 [kV], the reference voltage range may be set to 3% around the reference voltage. In other words, the reference voltage range may be set to 22.213 [V] to 23.587 [V].

The PMS 130 may monitor the power of the power system 200 by measuring a voltage at the terminal of the power system. The monitored voltage of the power system 200 may be represented as shown in FIG. 3.

Referring to FIG. 3, the voltage value Vg of the power system 200 may be outside the reference voltage range in periods (a) and (b). Thus, the PMS 130 may change the command value to be provided to the ESS 120 in the periods (a) and (b) to control the magnitude of the reactive power so that the voltage value Vg of the power system 200 is within the reference voltage range.

The voltage value Vg of the power system 200 may vary depending on the magnitude of the reactive power to be supplied to the power system 200. More specifically, the voltage value Vg of the power system 200 may increase as the magnitude of the reactive power to be supplied to the power system 200 increases. As the magnitude of the reactive power decreases, the voltage value Vg of the power system 200 may decrease.

In order to increase or decrease the magnitude of the reactive power currently supplied to the power system 200, the PMS 130 may provide the ESS 120 with a command value that allows the ESS 120 to generate a lagging or leading reactive power.

The ESS 120 may supply the lagging or leading reactive power to the power system 200 by adjusting phases of a current and a voltage based on the reactive power-related command value Q*. More specifically, the ESS 120 may supply the lagging reactive power (positive reactive power) to the power system 200 by controlling the phase of the current to be subsequent to the phase of the voltage. The ESS 120 may supply the leading reactive power (negative reactive power) to the power system 200 by controlling the phase of the current to be previous to the phase of the voltage.

A method of controlling the magnitude and the phase of each of the current and voltage using the command value for the current and voltage may include various schemes used in the art, and thus, detailed descriptions thereof will be omitted.

Referring to FIG. 4 and FIG. 5, for example, a maximum command value S* for an apparent power that the ESS 120 may output may be 250 [kVA] under a normal condition.

In one example, the active power-related command value P* may have a positive value and a negative value, respectively, depending on the charging command and discharging command. Because the maximum command value S* for the apparent power is 250 [kVA], the active power-related command value P* may have a value in a range of −250 [kV] to 250 [kV] depending on a power factor.

When the active power-related command value P* is determined, a maximum value $Q_{limit}$ that the reactive power-related command value Q* may have may be expressed as a following [Equation 1]:

$$Q_{limit} = \sqrt{(S^*)^2 - (P^*)^2}$$

As described above, because the reactive power includes the leading reactive power and the lagging reactive power, the reactive power-related command value Q* may have a value in a range of $-Q_{limit}$ [VAR] to $+Q_{limit}$ [VAR] depending on the power factor.

For example, as shown in FIG. 5, when the active power-related command value P* is $P_0$, a vector of the power supplied from the ESS 120 may shift along a hatched region while the P* of the active power-related command value is $P_0$.

When the voltage value Vg of the power system 200 exceeds the reference voltage range, the PMS 130 may change the command value to increase the magnitude of the leading reactive power to be supplied to the power system 200. To the contrary, when the voltage value Vg of the power system 200 is smaller than the reference voltage range, the PMS 130 may change the command value to increase the magnitude of the lagging reactive power to be supplied to the power system 200.

Referring back to FIG. 3, the voltage value Vg of the power system 200 may be smaller than the reference voltage range in the period (a). In this connection, the PMS 130 may change the command value to increase the magnitude of the lagging reactive power to be supplied to the power system 200.

In other words, when the voltage value Vg of the power system 200 is smaller than the reference voltage range, the PMS 130 may shift the vector of the power toward $+Q_{limit}$ in the hatched region of FIG. 5, thereby to increase the magnitude of the lagging reactive power to be supplied to the power system 200. For example, the PMS 130 may change a vector (a) of the power so that the reactive power-related command value Q* has a maximum value $Q_{limit}$ in the lagging direction.

Further, the voltage value Vg of the power system 200 in FIG. 3 may exceed the reference voltage range in the period (b). In this connection, the PMS 130 may change the command value to increase the magnitude of the leading reactive power to be supplied to the power system 200.

In other words, when the voltage value Vg of the power system 200 exceeds the reference voltage range, the PMS 130 may shift the vector of the power toward $-Q_{limit}$ in the hatched region of FIG. 5, thereby to increase the magnitude of the leading reactive power to be supplied to the power system 200. For example, the PMS 130 may change a vector (b) of the power so that the reactive power-related command value Q* has a maximum value $-Q_{limit}$ in the leading direction.

The PMS 130 may gradually control the magnitude of the reactive power to be supplied to the power system 200 according to a difference between the voltage value Vg of the power system 200 and the reference voltage range.

Referring to FIG. 6, the voltage value of the power system 200 may exceed the reference voltage range in periods (c) and (d). However, the difference between the voltage value Vg of the power system 200 and the reference voltage range thereof may be greater in the period (d) than that in the period (c).

The PMS 130 may control the magnitude of the reactive power to be supplied to the power system 200 in proportion to the difference between the voltage value Vg of the power system 200 and the reference voltage range thereof. More specifically, referring to FIG. 7, the active power-related command value P* for the active power to be supplied from the ESS 120 to the power system 200 may have $-P_0$. Since the active power-related command value $-P_0$ is negative, the ESS 120 may receive the active power corresponding to $P_0$ from the power system 200.

In this connection, the reactive power-related command value Q* may have a value in a range of $-Q_{limit}$ [VAR] to $+Q_{limit}$ [VAR] as defined based on the above Equation 1.

In the periods (c) and (d) in FIG. 6, the PMS 130 may change the command value to increase the magnitude of the leading reactive power, as described above.

In this connection, the PMS 130 may control the vector of the power so that the reactive power-related command value Q* becomes $Q_1$ in the leading direction in the period (c) where the difference between the current voltage of the power system 200 and the reference voltage range thereof is relatively smaller than that in the period (d), as shown in FIG. 7.

Further, the PMS 130 may further control the vector of the power so that the reactive power-related command value Q* becomes $Q_2$ in the leading direction in the (d) period where the difference between the current voltage of the power system 200 and the reference voltage range thereof is relatively larger than that in the period (c), as shown in FIG. 7.

Unlike the above manner, the PMS 130 may refer to a lookup table (LUT) to control the magnitude of the reactive power. In this connection, the lookup table may pre-store therein a variation of the reactive power-related command value Q* based on the difference between the voltage value Vg and the reference voltage range of the power system 200.

In this case, in the lookup table, a range of the difference between the voltage value Vg of the power system 200 and the reference voltage range thereof and the variation of the reactive power-related command value Q* based on the range may be preset. For example, the lookup table may pre-store therein a variation of the reactive power-related command value Q* when the voltage value Vg of the power system 200 is different from the reference voltage by 3% to 4%, and a variation of the reactive power-related command value Q* when the voltage value Vg of the power system 200 is different from the reference voltage by 4% to 5%.

The PMS 130 may identify the difference between the current voltage value of the power system 200 and the reference voltage thereof, and may refer to the LUT and then may control the magnitude of the reactive power in accordance with the variation of the reactive power-related command value Q* based on the corresponding difference.

As described above, in accordance with the present disclosure, the PMS may gradually control the magnitude of the reactive power based on the difference between the voltage value of the power system 200 and the reference voltage of the power system 200, such that the current voltage value of the power system 200 may quickly follow the reference voltage.

The PMS 130 may receive the voltage value Vg of the power system 200 at a regular interval, and may control the magnitude of the reactive power to be supplied to the power system 200 until the received voltage value Vg of the power system 200 changes to a value within the reference voltage range.

More specifically, the voltage value Vg of the power system 200 may be measured by a voltage sensor (not shown) disposed at the terminal of the power system. The PMS 130 may receive the measured voltage value Vg of the power system 200 from the voltage sensor according to a period set by a user.

The PMS 130 may control the magnitude of the reactive power based on the voltage value Vg of the power system 200, as described above. In this connection, a control period of the PMS 130 may be the same as or larger than a period at which the voltage value Vg of the power system 200 is received. Accordingly, the PMS 130 may control the reactive power and then receive the voltage value Vg of the power system 200 at least once. Thus, the voltage value Vg of the power system 200 varying based on the reactive power control may be monitored.

In other words, the PMS 130 may increase the magnitude of the lagging reactive power, and then monitor the voltage value Vg of the power system 200. Thus, the PMS 130 may identify whether the current voltage value Vg of the power system 200 increases. Further, the PMS 130 may increase the magnitude of the leading reactive power, and then monitor the voltage value Vg of the power system 200. Thus, the PMS 130 may identify whether the current voltage value Vg of the power system 200 decreases.

The PMS 130 may feedback-control the magnitude of the reactive power based on the monitored voltage value Vg of the power system 200. The PMS 130 may perform the above-described reactive power control operation until the current voltage value Vg of the power system 200 changes to a value within the reference voltage range.

As described above, in accordance with the present disclosure, the PMS 130 may control the magnitude of the reactive power to be supplied from the ESS 120 to the power system 200, such that the current voltage value of the power system 200 is maintained within a certain range from the reference voltage of the power system 200, thereby securing power system stability.

When the voltage value Vg of the power system 200 is outside a control limit range, the PMS 130 may stop creation of the command value. In this connection, the control limit range may be wider than the reference voltage range as described above. When the voltage value Vg of the power system 200 is outside the control limit range, the voltage control of the power system 200 cannot be realized even by the PMS 130 changing the command value.

An output of the renewable energy source may change rapidly over time. As the maximum power generation amount using the renewable energy source increases, the effect of the output of the renewable energy source on the power system 200 may be larger.

The ESS 120 may supply the reactive power stored in the battery 140 to the power system 200. A capacity of battery 140 may not be large to control unstable output of the renewable energy source. In this case, even when reactive power is supplied to the power system 200, the current voltage of the power system 200 may not be stabilized.

Accordingly, the PMS 130 may stop creating the command value when the voltage value Vg of the power system 200 is outside the control limit range. In order to protect the power system 200, the connection between the power generator 110 and the ESS 120 and the power system 200 may be disabled.

The control limit range may be set to an arbitrary range according to the user's setting. For example, when the reference voltage range is set to 3% around the reference voltage of the power system 200, the control limit range may be set to 6% around the reference voltage of the power system 200.

Accordingly, the PMS 130 may perform an operation of controlling the magnitude of the reactive power when the voltage value Vg of the power system 200 is different from the reference voltage thereof by 3% to 6%. When the voltage value Vg of the power system 200 differs by more than 6% from the reference voltage, the PMS 130 may stop creating the command value and may disable the connection between the power system 200 and the ESS 120.

As described above, in accordance with the present disclosure, when the voltage value of the power system 200 is outside the control limit range, the PMS 130 may stop the creation of the command value and may disable the connection between the power system 200 and the ESS 120 and the power generator 110. Thus, the power system 200 may be protected when the output of the renewable energy source fluctuates excessively.

When the control limit range is not set, the PMS 130 may identify a maximum magnitude $|Q_{limit}|$ of the reactive power as controllable, based on the active power magnitude and the above-described [Equation 1].

Subsequently, the PMS 130 may refer to the look-up table LUT stored in an internal memory thereof to identify the maximum magnitude $|Q_{limit}|$ of the reactive power, and then may identify a maximum voltage variation ΔVg of the power system 200 as controllable, based on the maximum magnitude $|Q_{limit}|$. In other words, when the magnitude of the active power is specified, the PMS 130 may identify a maximum range in which the voltage value Vg of the power system 200 varies when the reactive power is adjusted to the maximum value.

The PMS 130 may stop creating the command value when the identified maximum voltage variation ΔVg is greater than the difference between the current voltage value Vg of the power system 200 and the reference voltage range thereof.

The present disclosure as described above may be subjected to various substitutions, modifications and changes by those skilled in the art to which the present disclosure belongs, within a scope of the technical idea of the present disclosure. Thus, the scope of the present disclosure is not limited to the above-described embodiments and the accompanying drawings.

What is claimed is:

1. A system for stabilizing a voltage of a power system, the system comprising:
    a power generator generating power using a renewable energy source, and the power generator supplying the generated power to the power system;
    an energy storage system (ESS) storing the generated power from the power generator into a battery in response to a charging command, and the ESS supplying the power stored in the battery to the power system in a form of an active power and a reactive power in response to a discharging command; and
    a power management system (PMS) configured to:
        monitor a frequency of the power system and a voltage of the power system;
        based on the frequency of the power system exceeding a reference frequency range, transfer the charging command to the ESS;
        based on the frequency of the power system being below the reference frequency range, transfer the discharging command to the ESS;
        when the voltage of the power system exceeds a reference voltage range, change a vector of the power supplied by the ESS so that a reactive power-related command value corresponds to a maximum value in a leading direction to increase a magnitude of a leading reactive power to be supplied to the power system; and
        when the voltage of the power system is below the reference voltage range, change the vector so that the reactive power-related command value corresponds to the maximum value in a lagging direction to increase a magnitude of a lagging reactive power to be supplied to the power system.

2. The system for stabilizing the voltage of the power system of claim 1, wherein the PMS is configured to gradually control the magnitude of the reactive power to be supplied to the power system, based on a difference between the voltage of the power system and the reference voltage range of the power system.

3. The system for stabilizing the voltage of the power system of claim 1, wherein the PMS is configured to:
receive the voltage of the power system at a regular interval; and
control the magnitude of the reactive power to be supplied to the power system until the received voltage of the power system changes to a value within the reference voltage range.

4. The system for stabilizing the voltage of the power system of claim 1, wherein the PMS is configured to stop creating a command value when the voltage of the power system is outside a control limit range.

5. The system for stabilizing the voltage of the power system of claim 1, wherein the ESS includes a power conditioning system (PCS) configured to convert electrical characteristics of the power generated by the power generator according to a command value, or convert electrical characteristics of the power stored in the battery, based on the command value.

6. The system for stabilizing the voltage of the power system of claim 1, wherein the PMS is configured to:
when a power consumption amount by a load connected to the power system is greater than a power generation amount by the power generator, transfer the discharging command to the ESS; or
when the power consumption amount is smaller than the power generation amount, transfer the charging command to the ESS.

* * * * *